United States Patent
Koo et al.

(10) Patent No.: US 9,630,869 B1
(45) Date of Patent: Apr. 25, 2017

(54) APPARATUS FOR FORMING TOUCH WINDOW GLASS FOR PORTABLE TERMINAL

(71) Applicant: 61C&S Co., Ltd., Seoul-si (KR)

(72) Inventors: Ja-Ock Koo, Yongin-si (KR); Kue Jung Choi, Anseong-si (KR)

(73) Assignee: 61C&S CO., LTD., Seoul-si (KR)

( * ) Notice: Subject to any disclaimer, the term of this patent is extended or adjusted under 35 U.S.C. 154(b) by 0 days.

(21) Appl. No.: 14/959,459

(22) Filed: Dec. 4, 2015

(30) Foreign Application Priority Data

Oct. 5, 2015 (KR) ........................ 10-2015-0139577

(51) Int. Cl.
   *C03B 11/06* (2006.01)
   *C03B 11/08* (2006.01)
   *G06F 3/041* (2006.01)

(52) U.S. Cl.
   CPC ............ *C03B 11/08* (2013.01); *G06F 3/0414* (2013.01); *C03B 2215/50* (2013.01)

(58) Field of Classification Search
   CPC ..... C03B 11/06; C03B 11/08; C03B 2215/50; C03B 2215/80
   See application file for complete search history.

(56) References Cited

U.S. PATENT DOCUMENTS

2010/0127420 A1* 5/2010 Dannoux ............... C03B 11/10 264/235
2014/0367027 A1* 12/2014 Roh .................... C03B 23/0302 156/99

FOREIGN PATENT DOCUMENTS

JP    2010202419 A  *  9/2010
KR   101449365 B1  * 10/2014

* cited by examiner

*Primary Examiner* — Erin Snelting
(74) *Attorney, Agent, or Firm* — Hauptman Ham, LLP

(57) ABSTRACT

An apparatus for forming 3D glass for a smart phone, including a lower mold set including a first lower mold 52A and a first upper mold 50A having a cavity in which curved glass is formed between the first lower mold and the first upper mold when the first lower mold and the first upper mold are coupled, an upper mold set including a second lower mold 52B and a second upper mold 50B having a cavity in which curved glass is formed between the second lower mold and the second upper mold when the second lower mold and the second upper mold are coupled, and a plurality of support pins 60 supporting the upper mold set in the state in which the upper mold set has been spaced apart from the lower mold set at a specific interval.

2 Claims, 3 Drawing Sheets

APPARATUS FOR FORMING TOUCH WINDOW GLASS FOR PORTABLE TERMINAL

REFERENCE TO RELATED APPLICATIONS

This application claims the priority benefit of Korean Patent Application No. 10-2015-0139577 filed on Oct. 5, 2015, the entire contents of which are incorporated herein by reference.

FIELD OF THE INVENTION

The present invention relates to an apparatus for forming touch window glass for a portable terminal, such as a smart phone, and, more particularly, to an apparatus for forming touch window glass, which is suitable for mass production by configuring molds for forming touch window glass so that the molds are transferred to a high temperature chamber in a multi-stage stack state.

BACKGROUND OF THE INVENTION

Front glass called touch window glass for implementing the touch function of a liquid crystal panel is mounted on a portable terminal, such as a smart phone. Such front glass conventionally has a plan shape, but a product having a 3D shape in which at least one side has a curved surface is recently released.

FIG. 1 shows an example of touch window glass having such a 3D shape. The illustrated touch window glass includes a plane area A, that is, a central part and curved surface areas B formed to have curved surfaces on both sides of the plane area A. Furthermore, another example includes touch window glass in which a curved surface area is formed only on one side with respect to the plane area A, that is, a central part. Yet another embodiment includes touch window glass in which all of four sides generally surrounding the plane area A, that is, a central part, are formed of curved surface. In the touch window glass in which all of the four sides are formed of the curved surfaces as described above, pressure of an upper mold that is downward directed has a direct effect on a product.

Touch window glass having at least one curved surface area as described above is called 3D glass or curved touch window glass. Furthermore, various methods are used to form such 3D glass or curved glass, and a mold is basically used in the methods. Furthermore, the most basic form is shown in FIG. 2. In the example of FIG. 2, after glass G is placed between an upper mold 10 and a lower mold 12, curved glass, such as that described above, is formed by heating and pressurization.

In this case, a mold may be formed so that the upper mold 10 and the lower mold 12 corresponding to the entire curved glass generally come into surface contact with portions that belong to the upper mold 10 and the lower mold 12 and that come into contact with the curved glass. Alternatively, a mold may be designed so that part of a portion (i.e., a plane area) that belongs to the curved glass and that forms a plane is supported so that it can maintain the plane state by coming into contact with the upper mold 10 and the lower mold 12 and comes into contact with the upper mold and the lower mold only in the curved surface area.

Furthermore, FIG. 3 illustrates an example of a conventional mold disclosed in Korean Patent No. 10-1449365 issued to the present applicant. In such a conventional mold, glass G is supported between a lower mold 20 and an upper mold 24 in such a way as to maintain the plane state. Furthermore, middle blocks 22 are interposed in edge parts between the upper mold 24 and the lower mold 20 so that the location (or height) between the upper mold 24 and the lower mold 20 is maintained.

In such a state, cores 26 are inserted into the upper mold 24 from the top to the bottom. The bottom ends 26a of the cores 26 downward press the ends of the glass G in a high temperature atmosphere, thereby forming curved glass. In such a conventional example, glass in a portion in which the upper mold 24 comes into contact with the lower mold 20 forms a plane area, and curved surface areas are formed in outside parts in which the cores 26 come into contact with the glass.

A conventional forming apparatus, such as that described above, is described below. It may be seen that curved glass is formed between an upper mold and a lower mold. In a forming apparatus using such a conventional mold, however, it is practically impossible to load mold sets in multiple stages for mass production and to transfer the stacked mold sets to a high temperature chamber.

In the example of FIG. 2, if another mold set is stacked onto the upper mold 10, formed curved glass may be adversely affected because a downward force is applied to the upper mold 10. Furthermore, in the example of FIG. 3, if another mold set is stacked onto the upper mold 24 or the cores 26, an external force from the top is applied to the upper mold 10 or 24. If an external force is applied to the upper mold 10 or 24 as described above, there is a good possibility that it may be difficult to produce high-quality curved glass because the external force is applied to glass. If it is difficult to accurately load a mold, having an external appearance different from that of the molds of FIGS. 2 and 3, in multiple stages, mass production using the multiple stages of the molds may not be thought.

SUMMARY OF THE INVENTION

If a mold set, such as that described above, may be stacked in multiple stages and transferred to a high temperature chamber and such a multi-stage stack does not have an adverse effect on a product, to produce curved glass in a high temperature atmosphere using a plurality of multi-stage stacked mold sets may be significantly advantageous from a viewpoint of mass production.

An object of the present invention is to provide an apparatus for forming curved glass, which is advantageous for mass production by stacking molds for forming curved glass in multiple stages and transferring the stacked molds to a high temperature chamber.

Furthermore, such an object, that is, possible mass production, may have the meaning of reducing a production cost and further improving productivity. Furthermore, considering that molds stacked in multiple stages as described above are transferred to a high temperature chamber through a conveyer belt, a forming apparatus according to an embodiment of the present invention may be further advantageous in the mass production of touch window glass for a smart phone.

An apparatus for forming touch window glass for a portable terminal according to an embodiment of the present invention includes a lower mold set including a first lower mold and a first upper mold having a cavity in which curved glass is formed between the first lower mold and the first upper mold when the first lower mold and the first upper mold are coupled, an upper mold set including a second lower mold and a second upper mold having a cavity in which curved glass is formed between the second lower mold and the second upper mold when the second lower mold and the second upper mold are coupled, and a plurality of support pins supporting the upper mold set in the state in which the upper mold set has been spaced apart from the lower mold set at a specific interval. In this case, the top ends of the support pins are supported by support grooves formed in a bottom surface of the second lower mold of the upper mold set. The bottom ends of the support pins are supported by support grooves formed in a top surface of the first lower mold of the lower mold set in the state in which the support pins have penetrated the first upper mold of the lower mold set.

An apparatus for forming touch window glass for a portable terminal according to another embodiment of the present invention includes a lower mold set including a first lower mold and a first mold part for forming curved glass between the first lower mold and the first mold part when the first lower mold and the first mold part are coupled, an upper mold set including a second lower mold and a second mold part for forming curved glass between the second lower mold and the second mold part when the second lower mold and the second mold part are coupled, and a plurality of support pins supporting the upper mold set in the state in which the upper mold set has been spaced apart from the lower mold set at a specific interval. Furthermore, the top ends of the support pins are supported by support grooves formed in a bottom surface of the second lower mold of the upper mold set. The bottom ends of the support pins are supported by support grooves formed in a top surface of the first lower mold of the lower mold set in the state in which the support pins have penetrated the first mold part of the lower mold set.

DETAILED DESCRIPTION OF THE INVENTION

Figure 1:
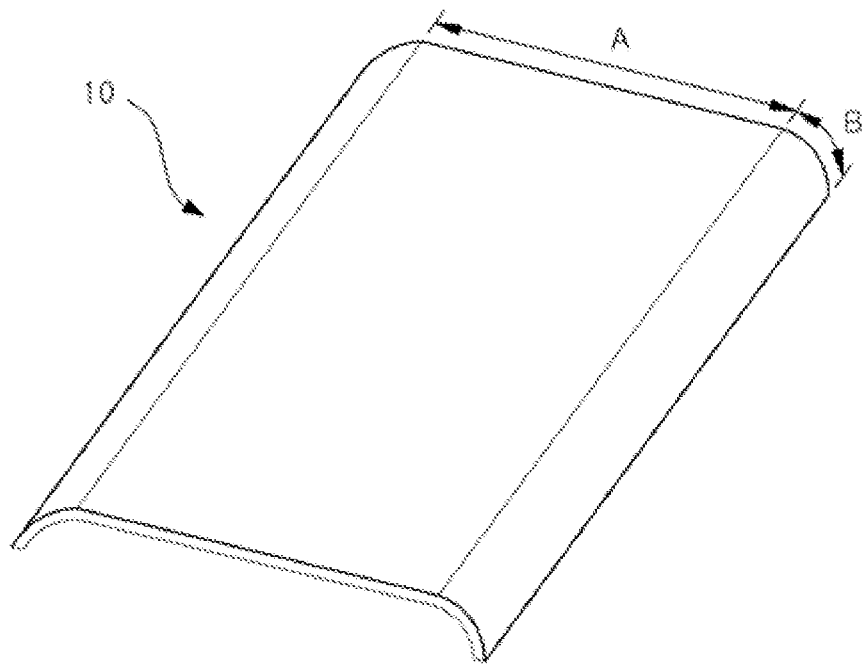
FIG. 1 is an exemplary diagram of conventional curved glass.
Figure 2:
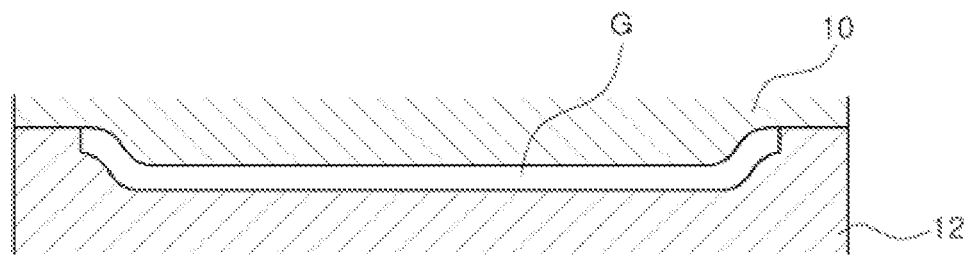
FIG. 2 is an exemplary cross-sectional view of a conventional mold for producing curved glass.
Figure 3:
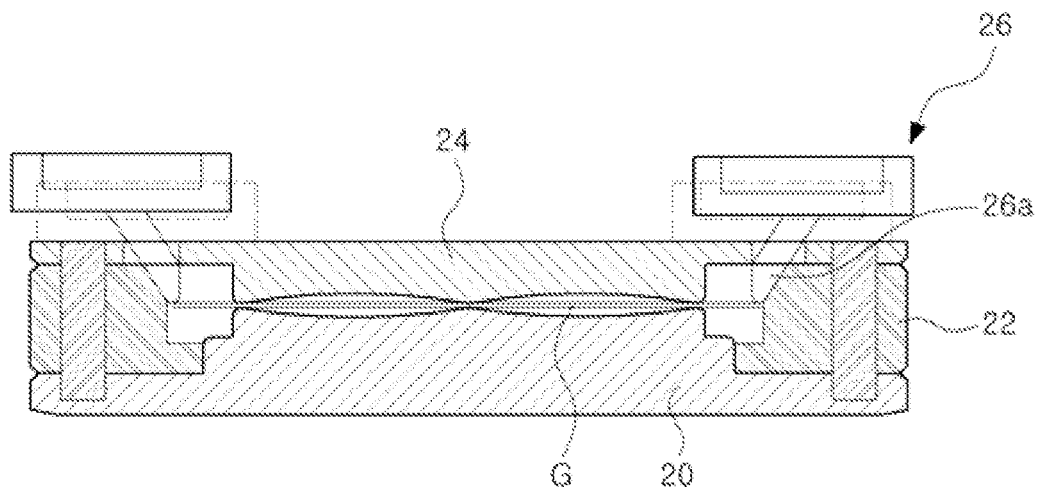
FIG. 3 is an exemplary cross-sectional view of a conventional another mold for producing curved glass.
Figure 4:
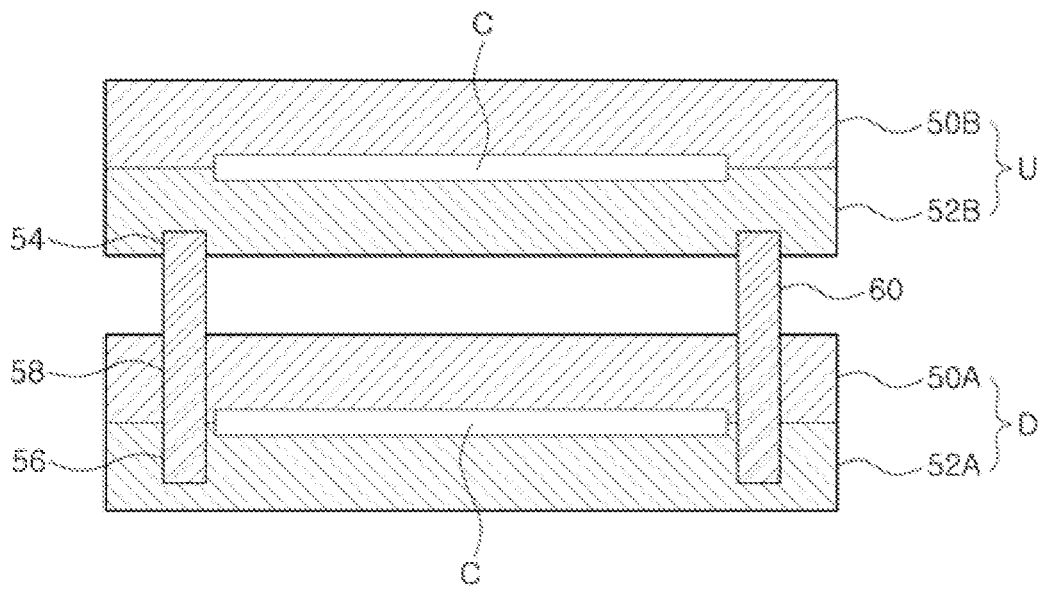
FIG. 4 is an exemplary cross-sectional view of an apparatus for producing curved glass according to a first embodiment of the present invention.

Embodiments of the present invention are described in detail with reference to the accompanying drawings. FIG. 4 is an exemplary cross-sectional view of an apparatus for producing curved glass according to a first embodiment of the present invention and shows the state in which mold sets have been stacked in two stages. An upper mold set U on the upper side supports a lower mold set D on the lower side in the state in which the upper mold set U is connected to the lower mold set D through a plurality of support pins 60.

As shown in FIG. 4, the upper mold set U includes an upper mold 50B and a lower mold 52B, and the lower mold set D also includes an upper mold 50A and a lower mold 52A. In this case, each of the upper mold set U (50A, 50B) and the lower mold set D (52A, 52B) may have a cavity C suitable for forming 3D glass (curved glass) as described above, but the cavities C respectively formed between the upper molds 50A and 50B and the lower molds 52A and 52B within the upper molds 50A and 50B and the lower molds 52A and 52B in order to form the curved glass are schematically shown, for convenience of drawing.

The support pins 60 according to an embodiment of the present invention function to support the upper mold set U against the lower mold set D. In this case, when weight of the upper mold set U is supported on the lower mold set D, weight that supports the upper mold set U needs to be designed so that it does not affect the upper mold 50A of the lower mold set D. Accordingly, in an embodiment of the present invention, the support pins 60 supporting weight of the upper mold set U are designed to be supported by the lower mold 52A of the lower mold set D in the state in which the support pins 60 have penetrated the upper mold 50A.

That is, the support pins 60 are supported by the lower mold 52A in the state in which they have penetrated through holes 58 formed in the upper mold 50A of the lower mold set D. Furthermore, the number of support pins 60 may be four, which are respectively installed in the corner parts of the upper mold or the lower mold having a hexahedron shape of a low height, for example. That is, four through holes 58 through which the support pins 60 penetrate are formed in the respective corner parts of the upper mold 50A.

Furthermore, four top surface support grooves 56 are formed at locations corresponding to the through holes 58 in the top surface of the lower mold 52A of the lower mold set D. Furthermore, bottom surface support grooves 54 to which the top ends of the support pins 60 are coupled are formed at the locations corresponding to the top surface support grooves 56 and the through holes 58 in the bottom surface of the lower mold 52B of the upper mold set U. Accordingly, the support pins 60 for supporting the upper mold set U are supported in the state in which the bottom ends of the support pins 60 have penetrated the through holes 58 and are coupled to the top surface support grooves 56 and in the state in which the top ends of the support pins 60 are inserted and coupled to the bottom surface support grooves 54.

The support pins 60 having such a coupling state support the entire weight of the upper mold set U. The weight of the upper mold set U is supported by the lower mold 52A of the lower mold set U. That is, the entire weight of the support pins 60 supporting the upper mold sets 50B and 52B is applied to the lower mold 52A of the lower mold sets 52A and 52B because the support pins 60 penetrate the upper mold 50A. However, the lower mold 52A of the lower mold set D is supported by the bottom surface of a high temperature chamber or supported on a conveyer belt transferred within the high temperature chamber. Accordingly, although the entire weight of the upper mold set U is supported, there is no influence on the forming of curved glass.

As described above, in touch window glass having all of four sides formed of curved surfaces, pressure applied to the upper mold has a direct effect on a product. In an embodiment of the present invention, weight of a multi-layer structure does not have any influence on quality of 3D glass because weight of the upper mold set U is applied to the lower mold 52A of the lower mold set D.

In the embodiment of FIG. 4, the two-stage mold sets have been illustrated, but the present invention is not limited thereto. For example, a mold set may be stacked in three stages using the same support pins 60. In order to stack a mold set in three stages as described above, in the embodiment of FIG. 4, the through holes 58 need to be formed in the upper mold U of the upper mold set U. The bottom surface support holes 54 may be formed in the bottom surface of the lower mold of a mold set placed on the upper mold U of the upper mold set U.

Figure 5:
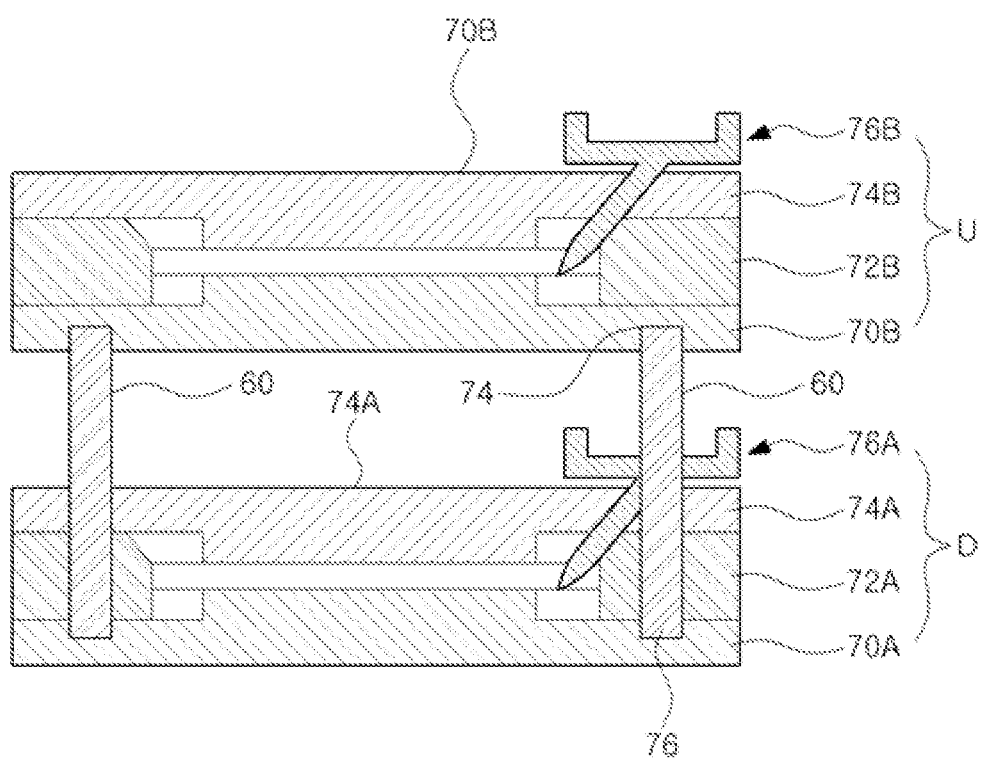
FIG. 5 is an exemplary cross-sectional view of an apparatus for producing curved glass according to a second embodiment of the present invention.

A second embodiment of the present invention is described below with reference to FIG. 5. In the present embodiment, an upper mold set U and a lower mold set D include lower molds 70A and 70B, upper molds 74A and 74B, and middle molds 72A and 72B inserted into edge portions between the lower molds 70A and 70B and the upper molds 74A and 74B. In this case, the lower molds 70A and 70B and the upper molds 74A and 74B function to maintain glass to be processed between the lower molds 70A and 70B and the upper molds 74A and 74B in the plane state. Cores 76A and 76B which penetrate the upper molds 74A and 74B apply a force to glass, thereby processing the glass into curved glass. Such a function is the same as that described in Korean Patent No. 10-1449365 issued to the present applicant.

As in the previous embodiment, the upper mold set U is supported over the lower mold set D by support pins 60 in the state in which the upper mold set U has been spaced apart from the lower mold set D at a specific interval. A detailed support relationship is described below. The top ends of the support pins 60 are supported in the state in which they have been inserted into support grooves 74 formed in the bottom surface of the lower mold 70B of the upper mold set U. The bottom ends of the support pins 60 are supported in the state in which they have been inserted into support grooves 76 formed in the top surface of the lower mold 70A of the lower mold set D.

The support pins 60 are inserted into the support grooves 76 formed in the top surface of the lower mold 70A in the state in which they have penetrated all of the upper mold 74A, cores 76A, and middle mold 72A of the lower mold set D. Accordingly, the entire weight of the upper mold set U is applied to the support pins 60. The weight applied to the support pins 60 is fully applied to the lower mold 70A because the upper mold 74A, cores 76A, and middle mold 72A of the lower mold set D have been penetrated. Accordingly, even in the present embodiment, the upper mold set U is supported by the support pins 60 in the state in which it has been spaced apart from the lower mold set D at a specific interval, and the entire weight of the upper mold set D is supported by the lower mold 70A of the lower mold set D.

Furthermore, in the first embodiment and second embodiment of the present invention, the upper mold set and the lower mold set have been illustrated as being installed up and down in two stages. However, the present invention may also be sufficiently applied to a case where the upper mold set and the lower mold set are stacked in three stages or four stages and 3D glass (or curved glass) is formed in a high temperature atmosphere.

Furthermore, in addition to the aforementioned embodiments, the present invention may also be applied to a mold set, including a lower mold, an upper mold placed over the lower mold, and a mold part coupled to the upper mold. For example, the present invention may also be applied to a mold set having a structure in which a lower mold and an upper mold are included and the upper mold presses glass in order to form 3D glass.

As described above, in accordance with an embodiment of the present invention, if the upper mold set is supported by the support pins in the state in which it has been upward spaced apart from the lower mold set at a specific interval, weight of the upper mold set applied to the support pins is applied to only the lower mold of the lower mold set.

In accordance with an embodiment of the present invention, when curved glass, that is, 3D glass in which at least one side is formed to have at least one curved surface, in a portable terminal, such as a smart phone, the curved glass can be formed in the state in which a mold has been stacked in multiple stages. If curved glass is formed in the state in which a mold has been stacked in multiple stages as described above, productivity can be improved and a production cost can be reduced.

Furthermore, those skilled in the art will understand that the present invention may be modified in other various ways within the category of the basic technical spirit of the present invention. It is considered that the scope to be protected by the present invention should be substantially interpreted based on the appended claims.

What is claimed is:

1. An apparatus for forming touch window glass for a portable terminal, comprising:
   a lower mold set comprising a first lower mold and a first upper mold having a cavity in which curved glass is formed between the first lower mold and the first upper mold when the first lower mold and the first upper mold are coupled;
   an upper mold set comprising a second lower mold and a second upper mold having a cavity in which curved glass is formed between the second lower mold and the second upper mold when the second lower mold and the second upper mold are coupled; and
   a plurality of support pins supporting the upper mold set in a state in which the upper mold set has been spaced apart from the lower mold set at a specific interval,
   wherein top ends of the support pins are supported by support grooves formed in a bottom surface of the second lower mold of the upper mold set, and
   bottom ends of the support pins are supported by support grooves formed in a top surface of the first lower mold of the lower mold set in a state in which the support pins have penetrated the first upper mold of the lower mold set.

2. An apparatus for forming touch window glass for a portable terminal, comprising:
   a lower mold set comprising a first lower mold and a first mold part for forming curved glass between the first lower mold and the first mold part when the first lower mold and the first mold part are coupled;
   an upper mold set comprising a second lower mold and a second mold part for forming curved glass between the second lower mold and the second mold part when the second lower mold and the second mold part are coupled; and
   a plurality of support pins supporting the upper mold set in a state in which the upper mold set has been spaced apart from the lower mold set at a specific interval,
   wherein top ends of the support pins are supported by support grooves formed in a bottom surface of the second lower mold of the upper mold set, and
   bottom ends of the support pins are supported by support grooves formed in a top surface of the first lower mold of the lower mold set in a state in which the support pins have penetrated the first mold part of the lower mold set.

* * * * *